Feb. 10, 1925.

C. J. COBERLY 1,525,721

PROCESS OF SLOTTING METALS

Filed Sept. 11, 1923

INVENTOR:
CLARENCE J. COBERLY,
BY

ATTORNEYS.

Patented Feb. 10, 1925.

1,525,721

UNITED STATES PATENT OFFICE.

CLARENCE J. COBERLY, OF LOS ANGELES, CALIFORNIA.

PROCESS OF SLOTTING METALS.

Application filed September 11, 1923. Serial No. 662,042.

*To all whom it may concern:*

Be it known that I, CLARENCE J. COBERLY, a citizen of the United States, residing at Los Angeles, in the county of Los Angeles and State of California, have invented a new and useful Process of Slotting Metals, of which the following is a specification.

My invention relates to the art of cutting metals and more particularly to the art of cutting metals with a gas torch.

In this art an oxygen jet is utilized, this jet being preferably directed through the metal to be cut, forming therewith, a slag which is thrown out of the cut by the force of the jet, the result being a thin cut through the material. In one application of the cutting torch, it is desired to produce a slot in plates, pipe, or the like, and my invention is particularly applicable to such cutting.

It is an object of my invention to provide means by which a slot of substantially uniform cross section and any desired length may be cut in any fusible metal or material. Further objects and advantages will be made evident hereinafter.

Referring to the drawing which is for illustrative purposes only,

Prior to my invention it has been found very difficult to cut slots of uniform width in any sort of plate material due to the fact that it is hard to get the slot started without cutting a hole of larger diameter than the desired slot.

Figure 1:
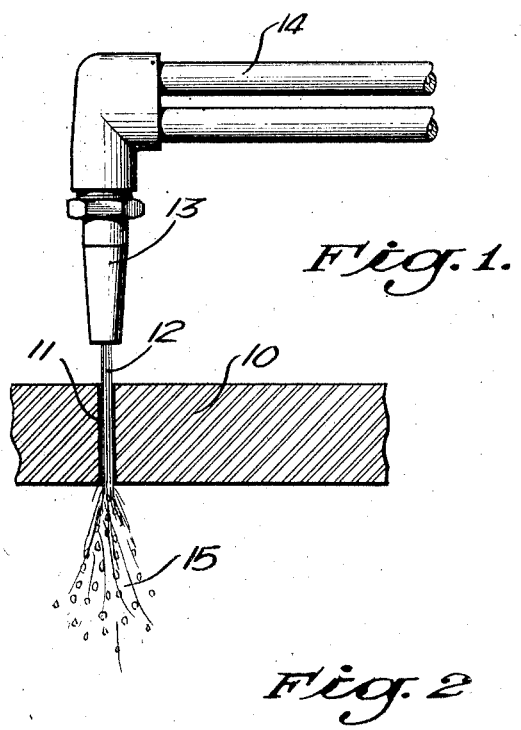
Fig. 1 is a diagrammatic view showing a cutting torch and its method of operating upon the material, which is shown in section.
Figure 2:
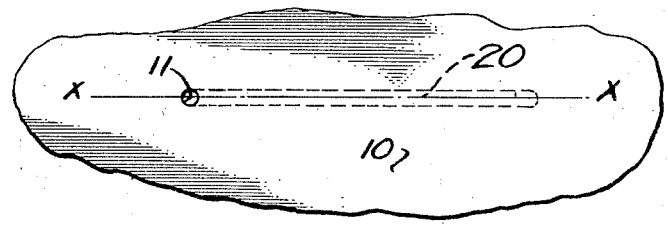
Fig. 2 is an elevation of the material prior to cutting, the desired slot being shown in dotted lines.

In the practice of my invention I drill in the material 10, which it is desired to cut, a cylindrical hole 11 when preferably passes entirely through the material and which is of the same diameter as the slot to be cut or preferably of a slightly smaller diameter. I then direct the cutting jet 12 from the tip 13 of a cutting torch 14 through the hole, as shown in Fig. 1, the oxygen uniting with the metal and throwing it out in the form of slag as shown in Fig. 1. As soon as the metal has become sufficiently heated to form slag, I move the tip 13 along the line $x$—$x$ of Fig. 2, thus cutting a slot as shown at 20. By this method I am able to cut slots which are substantially uniform in thickness thoughout their length, which slots can be made of any desired length.

I claim as my invention:

1. A process for cutting slots of uniform width in metal members which comprises: drilling a hole to provide a starting point for the slot; forcing a cutting flame through said hole from a suitable burner; and then moving said burner to cause said flame to cut the desired slot.

2. A process for cutting openings in metal members which comprises: mechanically forming a hole extending entirely through said metal member; heating the walls of said hole up to the point where the metal will readily combine with a cutting gas; and then enlarging said hole to form the desired opening by directing a jet of said cutting gas through said hole.

3. A process for cutting slots in a metal member which comprises: drilling a hole entirely through the metal member; heating the walls of the hole up to a point where the metal will readily combine with a cutting gas; passing a jet of said cutting gas through the hole to start combustion therein; and then moving said jet to form said slot.

In testimony whereof, I have hereunto set my hand at Los Angeles, California, this 5th day of September, 1923.

CLARENCE J. COBERLY.